(12) United States Patent
Nishii et al.

(10) Patent No.: US 7,465,249 B2
(45) Date of Patent: Dec. 16, 2008

(54) TOROIDAL TYPE CONTINUOUSLY VARIABLE TRANSMISSION

(75) Inventors: Hiroki Nishii, Kanagawa (JP); Eiji Inoue, Kanagawa (JP)

(73) Assignee: NSK Ltd., Tokyo (JP)

( * ) Notice: Subject to any disclaimer, the term of this patent is extended or adjusted under 35 U.S.C. 154(b) by 622 days.

(21) Appl. No.: 11/258,516

(22) Filed: Oct. 26, 2005

(65) Prior Publication Data
US 2006/0122030 A1  Jun. 8, 2006

(30) Foreign Application Priority Data
Oct. 26, 2004 (JP) .......................... P. 2004-311392
Oct. 26, 2004 (JP) .......................... P. 2004-311397

(51) Int. Cl.
*F16H 55/32* (2006.01)

(52) U.S. Cl. ............................... 476/72; 476/73; 476/42

(58) Field of Classification Search .................. 476/40, 476/42, 45, 46, 67, 72, 73
See application file for complete search history.

(56) References Cited

U.S. PATENT DOCUMENTS 2,847,861 A   8/1958  Weisel 6,637,107 B2 * 10/2003 Yasuhara et al. ............... 29/888
7,261,668 B2 *  8/2007 Kamamura et al. ........... 476/40
2003/0013574 A1 *  1/2003 Misada et al. ................. 476/40
2004/0082272 A1   4/2004 Nakayama et al.
2006/0160657 A1 *  7/2006 Magyari ....................... 476/72

FOREIGN PATENT DOCUMENTS

| DE | 696 22 959 T2 | 4/2003 |
| EP | 1 083 368 A2 | 3/2001 |
| EP | 1 167 819 A2 | 1/2002 |
| EP | 1 235 002 A2 | 2/2002 |
| JP | 2003-278869 A | 10/2003 |
| JP | 2003-343675 A | 12/2003 |

* cited by examiner

*Primary Examiner*—David M Fenstermacher
(74) *Attorney, Agent, or Firm*—Sughrue Mion, PLLC

(57) ABSTRACT

A toroidal type continuously variable transmission has an input shaft to which a rotation torque is input, an input side disk and an output side disk that are concentrically and rotatably supported by the input shaft in a state that an inner peripheral surface of the input side disk opposes to an inner peripheral surface of the output side disk, a power roller held between the input side disk and the output side disk and a hydraulic loading device applying predetermined pressing force so that the power roller is pressed between the input and output side disks. Fine grooves are formed on at least a radially inner part of the inner peripheral surface of the input side disk and at least radially outer part of the inner peripheral surface of the output side disk, respectively.

8 Claims, 7 Drawing Sheets

TOROIDAL TYPE CONTINUOUSLY VARIABLE TRANSMISSION

The present invention claims foreign priority to Japanese patent application Nos. P.2004-311392 and P.2004-311397, both of which filed on Oct. 26, 2004, the contents of which are incorporated herein by references.

BACKGROUND OF THE INVENTION

1. Field of the Invention

The present invention relates to a toroidal type continuously variable transmission which can be used to a transmission for an automobile and various industrial machines.

2. Description of the Background Art

For example, a double-cavity-type toroidal type continuously variable transmission used as a transmission for an automobile is structured as shown in FIGS. 3 and 4. As shown in FIG. 3, inside a casing 50, there is supported an input shaft (center shaft) 1 in such a manner that it can be rotated. On the outer periphery of the input shaft 1, there are mounted two input side disks 2, 2 and two output side disks 3, 3. Also, on the outer periphery of the middle portion of the input shaft 1, there is rotatably supported an output gear 4. The output gear 4 includes in the central portion thereof cylindrical-shaped flange portions 4a, 4a which are respectively connected to the output side disks 3, 3 through spline engagement.

The input shaft 1 can be driven and rotated by a drive shaft 22 through a loading-cam-type pressing device 12 interposed between a cam plate 7 and the input side disk 2 that is positioned on the left side in FIG. 3. Also, the output gear 4 is supported within the casing 50 through a partition wall 13 constructed by connecting two members to each other, whereby the output gear 4 can be rotated about the center axis O of the input shaft 1 but it is prevented from shifting in the direction of the center axis O.

The output side disks 3, 3 are respectively supported by needle bearings 5, 5 respectively interposed between the input shaft 1 and the respective disks in such a manner that they can be rotated about the center axis O of the input shaft 1. Also, the input side disk 2 shown on the left side in FIG. 3 is supported on the input shaft 1 through a ball spline 6 and the input side disk 2 shown on the right side in FIG. 3 is spline connected to the input shaft 1, while these two input side disks 2 can be rotated together with the input shaft 1. Further, between the inner surfaces (concave-shaped surfaces) 2a, 2a of the input side disks 2, 2 and the inner surfaces (concave-shaped surfaces) 3a, 3a of the output disks 3, 3, there are held power rollers 11 (see FIG. 4) in such a manner that they can be rotated.

On the inner peripheral surface 2c of the input side disk 2 positioned on the right side in FIG. 3, there is provided a stepped portion 2b against which a stepped portion 1b provided on the outer peripheral surface 1a of the input shaft 1 is butted, while the back surface (the right surface in FIG. 3) of the input side disk 2 is butted against a loading nut 9. This substantially prevents the input side disk 2 from shifting from the input shaft 1 in the center axis O direction. Also, between the cam plate 7 and the collar portion 1b of the input shaft 1, there is interposed a counter sunk spring 8 which applies a pressing force to contact portions where the concave-shaped surfaces 2a, 2a, 3a, 3a of the respective disks 2, 2, 3, 3 and the peripheral surfaces 11a, 11a of their corresponding power rollers 11, 11 are contacted with each other.

Now, FIG. 4 is a section view taken along the line A-A shown in FIG. 3. As shown in FIG. 4, inside the casing 50, there are provided a pair of trunnions 15, 15 which can be swung about a pair of pivot shafts 14, 14 torsionally positioned with respect to the input shaft 1. Here, in FIG. 4, the illustration of the input shaft 1 is omitted. The respective trunnions 15, 15 include, in the two end portions thereof in the longitudinal direction (in FIG. 4, in the vertical direction) of their respective support plates 16, a pair of bent wall portions 20, 20 which are formed so as be bent in the direction of the inner surface side of the support plates 16. Thanks to the formation of these bent wall portions 20, 20, in the respective trunnions 15, 15, there are formed concave-shaped pocket portions P which are used to store their respective power rollers 11 therein. Also, on the outer surfaces of the respective bent wall portions 20, 20, there are provided the pivot shafts 14, 14 such that they are concentric with each other.

In the central portion of each support plate portion 16, there is formed a circular hole 21; and, in the circular hole 21, there is supported the base end portion (first shaft portion) 23a of a shift shaft 23. And, if the trunnions 15, 15 are respectively swung about their respective pivot shafts 14, 14, the inclination angles of the shift shafts 23 supported on the central portions of the respective trunnions 15, 15 can be adjusted. Also, on the peripheries of the leading end portions (second shaft portions) 23b of the shift shafts 23 projected out from the inner surfaces of the respective trunnions 15, 15, there are respectively supported the power rollers 11, 11 in such a manner that they can be rotated; and, the power rollers 11, 11 are respectively held between the input side disks 2, 2 and output side disks 3, 3. Here, the base end portions 23a and leading end portions 23b of the respective shift shafts 23, 23 are eccentric to each other.

Also, the pivot shafts 14, 14 of the respective trunnions 15, 15 are supported in such a manner that they can be swung with respect to a pair of yokes 23A, 23B and can be shifted in the axial direction thereof (in the front and back direction in FIG. 3, in the vertical direction in FIG. 4); and, the movements of the trunnions 15, 15 in the horizontal direction thereof are restricted by their respective yokes 23A, 23B. The yokes 23A, 23B are respectively formed into a rectangular shape by press working or forging metal such as steel. Each of the yokes 23A, 23B includes in the four corners thereof four circular support holes 18, and the four pivot shafts 14 disposed on the two end portions of the trunnions 15 are respectively supported on the four holes 18 in such a manner that they can be swung. In the central portions of the yokes 23A, 23B in the width direction thereof (in the right and left direction in FIG. 3), there are formed circular-shaped securing holes 19. The inner peripheral surfaces of the securing holes 19 are formed as spherically concave-shaped surfaces, while spherical surface posts 64, 68 are respectively fitted into the spherically concave-shaped surfaces of the securing holes 19. That is, the upper yoke 23A is swingably supported by the spherical surface post 64 which is supported on the casing 50 through a fixing member 52, while the lower yoke 23B is swingably supported by the spherical surface post 68 and the upper cylinder body 61 of a cylinder 31 supporting the spherical surface post 68.

Here, the shift shafts 23, 23 disposed on the respective trunnions 15, 15 are set in positions which are present 180 deg. opposite each other with respect to the input shaft 1. The direction, in which the leading end portions 23b of the respective shift shafts 23, 23 are eccentric to the base end portions 23a, is the same direction (in the reversed vertical direction in FIG. 4) with respect to the direction of rotation of the input side and output side disks 2, 2, 3, 3. Also, the eccentric direction is a direction which is substantially perpendicular to the direction of disposition of the input shaft 1. Thus, the respective power rollers 11, 11 are supported in such a manner that they can be shifted to some extent in the longitudinal direction of the input shaft 1. As a result of this, even when the respective power rollers 11, 11 tend to shift in the axial direction of the input shaft 1 due to the elastic deformation or the like of the respective composing members caused by a thrust load produced by the pressing device 12, unreasonable forces are not applied to the respective composing members but the shifting motion of the power roller 11 can be absorbed.

Also, between the outer surfaces of the respective power rollers 11 and the inner surfaces of the respective support plate portions 16 of the trunnions 15, in order starting from the outer surfaces of the power rollers 11, there are interposed thrust ball bearings 24 consisting of thrust ball-and-roller bearings and thrust needle bearings 25. Of these elements, the thrust ball bearings 24 not only support thrust-direction loads applied to the respective power rollers 11 but also allow the power rollers 11 to rotate. Each of the thrust ball bearings 24 consists of two or more balls 26, 26, an annular-shaped retainer 27 for retaining the respective balls 26, 26 in such a manner that the balls 26, 26 are free to roll, and an annular-shaped outer race 28. Also, the inner race tracks of the thrust ball bearings 24 are formed on the outer surfaces (large end faces) of their respective power rollers 11, while the outer race tracks of the ball bearings 24 are formed on the inner surfaces of their respective outer races 28.

Each thrust needle bearing 25 is held between the inner surface of the support plate portion of its corresponding trunnion 15 and the outer surface of the corresponding outer race 28. The thus-arranged thrust needle bearings 25 not only support thrust loads applied to the respective outer races 28 from their corresponding power rollers 11 but also allow the power rollers 11 and outer races 28 to swing about the base end portions 23a of the respective shift shafts 23.

On the one-end portions (lower end portions in FIG. 4) of the respective trunnions 15, 15, there are respectively disposed drive rods (trunnion shafts) 29, 29, while drive pistons (oil pressure pistons) 33, 33 are fixedly secured to the outer peripheral surfaces of the middle portions of the respective drive rods 29, 29. And, the drive pistons 33, 33 are respectively fitted in an liquid tight manner into the drive cylinder 31 consisting of the upper cylinder body 61 and lower cylinder body 62. The drive pistons 33, 33 and drive cylinder 31 constitute a drive unit 32 which can shift the respective trunnions 15, 15 in the axial directions of the pivot shafts 14, 14 of these trunnions 15, 15.

In the case of the thus-structured toroidal type continuously variable transmission, the rotation of the input shaft 1 is transmitted through the pressing device 12 to the respective input side disks 2, 2. And, the rotational movements of these input side disks 2, 2 are then transmitted through the pair of power rollers 11, 11 to the respective output side disks 3, 3; and, further, the rotational movements of the output side disks 3, 3 are taken out from the output gear 4.

To change a rotation speed ratio between the input shaft 1 and output gear 4, the pair of drive pistons 33, 33 may be shifted in the mutually opposing directions. When the respective drive pistons 33, 33 are shifted in this manner, the pair of trunnions 15, 15 are shifted in the mutually opposing directions. For example, the power roller 11 shown on the left side in FIG. 4 is shifted downward in FIG. 4, whereas the power roller 11 shown on the right side in FIG. 4 is shifted upward in FIG. 4. This changes the directions of tangential-direction forces applied onto the contact portions between the peripheral surfaces 11a, 11a of the respective power rollers 11, 11 and the inner surfaces 2a, 2a, 3a, 3a of the input side disks 2, 2 and output side disks 3, 3. With the change in the directions of the forces, the respective trunnions 15, 15 are swung in the mutually opposing directions about the pivot shafts 14, 14 which are pivotally supported on the yokes 23A, 23B.

This changes the contact positions between the peripheral surfaces 11a, 11a of the respective power rollers 11, 11 and the corresponding inner surfaces 2a, 3a, which then changes the rotation speed ratio between the input shaft 1 and output gear 4. Also, when the torque to be transmitted between the input shaft 1 and output gear 4 varies to thereby change the quantities of elastic deformation of the respective composing members, the respective power rollers 11, 11 and the outer races 28, 28 belonging to these power rollers 11, 11 are rotated slightly about the base end portions 23a, 23a of the respective shift shafts 23, 23. Such rotational movements are executed smoothly because the thrust needle bearings 25, 25 are present between the outer surfaces of these outer races 28, 28 and the inner surfaces of the support plate portions 16 constituting the respective trunnions 15, 15. This can reduce a force which is used to change the inclination angles of the respective shift shafts 23, 23 in such a manner as described above.

Now, in the thus-structured toroidal type continuously variable transmission, power is transmitted through the shearing force of oil (traction oil) existing between the input and output side disks 2, 3 and their corresponding power rollers 11 (between traction surfaces (rolling surfaces)) (see e.g. Japanese Patent Unexamined Publications No. JP-A-2003-343675 and JP-A-2003-278869). Because the coefficient of traction oil is fixed, to transmit high torque, a large load (pressing force) must be applied to the contact points between the input side and output side disks 2, 3 and power rollers 11.

A method for applying the above load includes a case using the before-described pressing device 12 of a loading cam type which mechanically generates a load in proportion to input torque, and a case using a pressing device of a hydraulic pressure type. In the case where only the pressing device 12 of a loading cam type, there is generated a thrust force (the pressing force of the input side disk) in proportion only to the input torque; and, therefore, depending on the transmission gear ratios, there is a fear that an excessive pressing force can act on the contact portions between the disks and rollers to thereby reduce the transmission efficiency and durability of the composing members. On the other hand, when the pressing device of hydraulic pressure type is used, the optimum pressing force can be applied in compliance with the transmission gear ratios, oil temperatures, numbers of revolutions and the like, which makes it possible to enhance the transmission efficiency and durability of the transmission when compared with the pressing device of a loading cam type.

Now, in order to widen the transmission range and disuse a starting device, there is conventionally known a transmission which is a combination of a toroidal type continuously variable transmission and a planetary gear mechanism and is capable of switching speed modes over to each other (that is, includes two or more speed modes).

In the above-mentioned transmission including a planetary gear mechanism, there occurs torque reversal at the mode switching areas, which makes it easy to cause torque shift (a phenomenon in which the power roller 11 is out of its center axis and thus slips sideways to thereby shift the set transmission gear ratio). This torque shift is caused by a difference in transformation between the composing members due to variations in the pressing force or by the rickety motion and worsened rigidity of the trunnions and power rollers due to variations in the traction force. When such torque shift is produced, in the mode switching time, a shock is given to the transmission and thus an automobile carrying the transmission on board, which reduces the riding feeling of the automobile. Also, when sudden torque shift occurs, there is a possibility that inconveniences such as a gross slip can be produced.

However, in the low speed time, due to the contact radius and transmission torque between the input side disk and power roller, there is required a high pressing force (in a toroidal type continuously variable transmission, the contact radius between the disk and power roller varies in accordance with transmission gear ratios and thus the necessary pressing force varies). Therefore, the surface pressure of the contact portion between the disk and power roller (in the case of a half toroidal type continuously variable transmission, the surface pressure of the power roller 1011 as well) becomes high, which has ill effects on the durability of the composing parts. Also, when the durability of the composing parts is raised, they become large in size.

SUMMARY OF THE INVENTION

The present invention is made in the light of the above-mentioned conventional circumstances. That is, it is one of objects of the invention to provide a toroidal type continuously variable transmission which not only can apply the optimum pressing force in accordance with transmission gear ratios but also can obtain a desired transmission gear ratio with a lower pressing force than the conventional transmission to thereby reduce the occurrence of torque shift.

In order to achieve the above mentioned object, according to a first aspect of the present invention, there is provided a toroidal type continuously variable transmission comprising:

an input shaft to which a rotation torque is input;

an input side disk and an output side disk that are concentrically and rotatably supported by the input shaft in a state that an inner peripheral surface of the input side disk opposes to an inner peripheral surface of the output side disk;

a power roller held between the input side disk and the output side disk; and a hydraulic loading device applying predetermined pressing force so that the power roller is pressed between the input side disk and the output side disk, wherein fine grooves are formed on at least a radially inner part of the inner peripheral surface of the input side disk and at least radially outer part of the inner peripheral surface of the output side disk, respectively.

According to a second aspect of the present invention, there is provided a toroidal type continuously variable transmission apparatus comprising:

a toroidal type continuously variable transmission comprising:

an input shaft to which a rotation torque is input;

an input side disk and an output side disk that are concentrically and rotatably supported by the input shaft in a state that an inner peripheral surface of the input side disk opposes to an inner peripheral surface of the output side disk;

a power roller held between the input side disk and the output side disk; and a hydraulic loading device applying predetermined pressing force so that the power roller is pressed between the input side disk and the output side disk; and a planetary gear transmission unit adopted to switch a pluralities of speed mode, wherein fine grooves are formed on around speed mode changing areas of respective the inner peripheral surfaces of the input side disk and the output side disk, and wherein the speed mode switching areas contact with the power roller when the planetary gear transmission unit switches the speed mode.

According to a third aspect of the present invention, as set forth in the second aspect of the present invention, it is preferable that the fine grooves are formed on a radial outer part of the inner peripheral surface of the input side disk and on a radial inner part of the inner peripheral surface of the output side disk, respectively.

According to a fourth aspect of the present invention, as set forth in the second aspect of the present invention, it is preferable that the planetary gear transmission unit is connected with the input side disk and the output side disk.

According to fifth and seventh aspects of the present invention, it is preferable that depth of the fine groove is 1 μm or more and 10 μm or less.

According to sixth and eighth aspects of the present invention, it is preferable that pitch of the fine grooves is 100 μm or more and 300 μm or less.

In a toroidal type continuously variable transmission according to the invention, due to use of a pressing device of a hydraulic type, the optimum pressing force can be applied in accordance with transmission gear ratios; and, at the same time, because there are formed fine grooves in the inner peripheral surface areas of the input and output side disks where the disks are contacted with the power rollers at least at the switching areas of the speed modes or in the neighborhood of such peripheral surfaces areas, the design traction coefficient can be increased, thereby being able to reduce the pressing force. Thanks to this, by reducing the pressing force in the periphery of the switching areas of the speed modes, the torque shift can be reduced, or it is possible to secure an allowance for the gross slip at the switching areas of the speed modes.

By the way, the above-mentioned fine groove may preferably have a depth of about 1-10 μm and a pitch of about 100-300 μm. Also, if the roughness of the fine groove is large, there is a possibility that the rolling life thereof can be shortened. Therefore, preferably, the fine groove may not be formed on the entire traction surface but they may be formed only at the switching areas of the speed modes. This arrangement is advantageous in working as well. That is, in the case of the fine grooves, it is necessary to round the head portions thereof or the corner portions thereof, which requires an extra finishing step for execution of such rounding operations. However, when the fine grooves are formed only at the speed mode switching areas to thereby narrow the finishing range, the working cost of the fine grooves can be reduced.

In a toroidal type continuously variable transmission according to the invention, due to use of a pressing device of a hydraulic pressure type, the optimum pressing force can be applied in accordance with transmission gear ratios; and, at the same time, because there are formed fine grooves at least in the radially inner part of the inner peripheral surface of the above-mentioned input side disk and in the radially outer part of the inner peripheral surface of the above-mentioned output side disk, that is, in the contact areas between the input and output side disks and their respective power rollers which correspond to the low speed (speed reducing) time, the design traction coefficient can be increased. Thanks to this, not only the pressing force can be reduced but also the durability of the respective parts (for example, disks, power rollers, trunnions, shafts and the like) can be enhanced, whereby the size of the transmission can be reduced.

By the way, each of the above-mentioned fine grooves preferably has a depth of about 1-10 μm and a pitch of 100-300 μm. Also, when the roughness of the fine groove is large, there is a possibility that the rolling life can be shortened. Therefore, preferably, the fine grooves may not be formed in the entire areas of the traction surface but may be formed only on the low speed side which is low in the frequency of use and provides a high load. This arrangement is advantageous also in working. That is, in forming the fine grooves, the head portions or corner portions thereof must be rounded, which requires a separate finishing step of rounding these portions. If the fine grooves are formed only on the low speed side to thereby narrow the finishing range, the working cost of the fine grooves can be reduced.

DETAILED DESCRIPTION OF THE PREFERRED EMBODIMENTS

Figure 3:
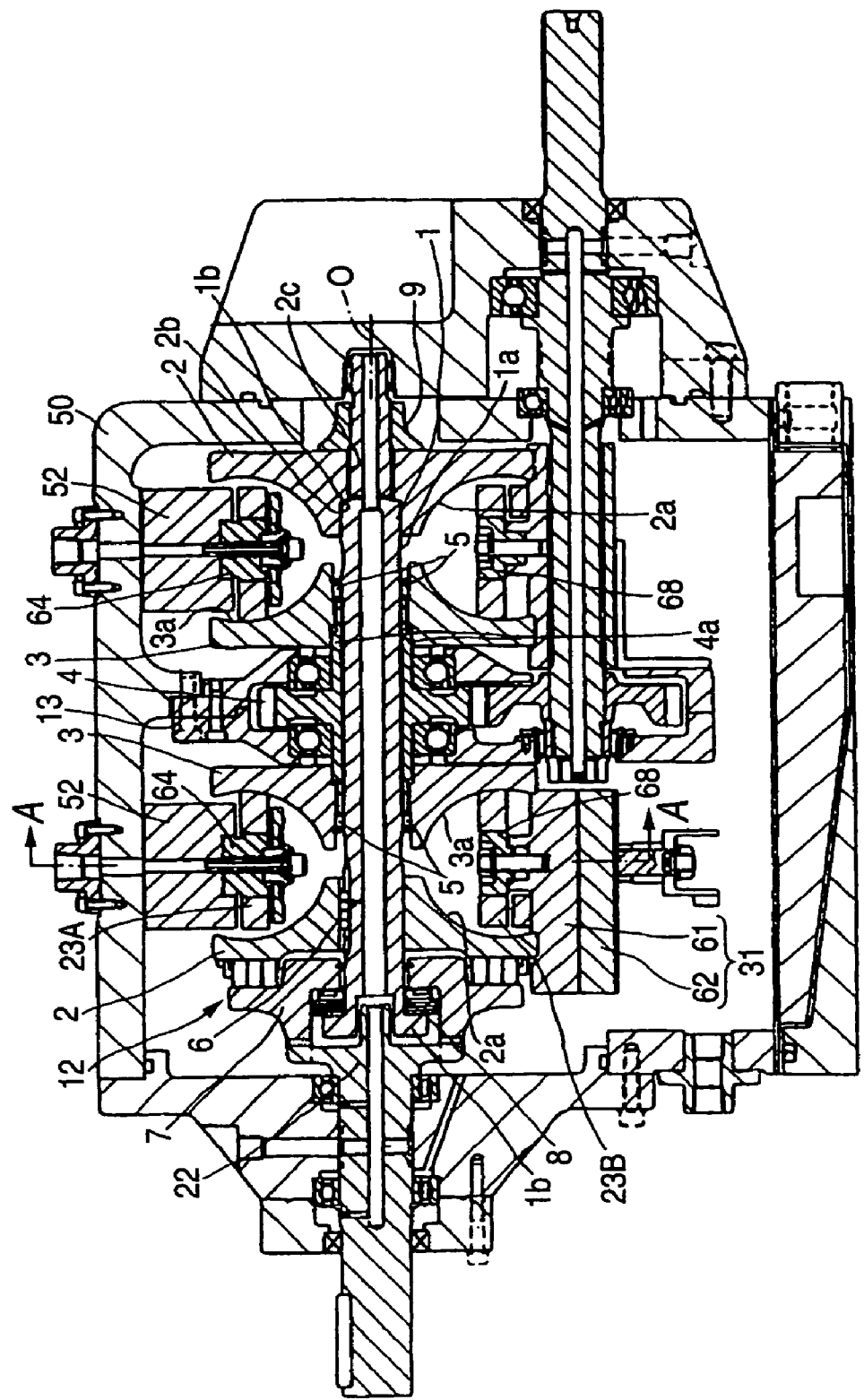
FIG. 3 is a section view of a concrete example of a conventionally known half toroidal type continuously variable transmission.
Figure 4:
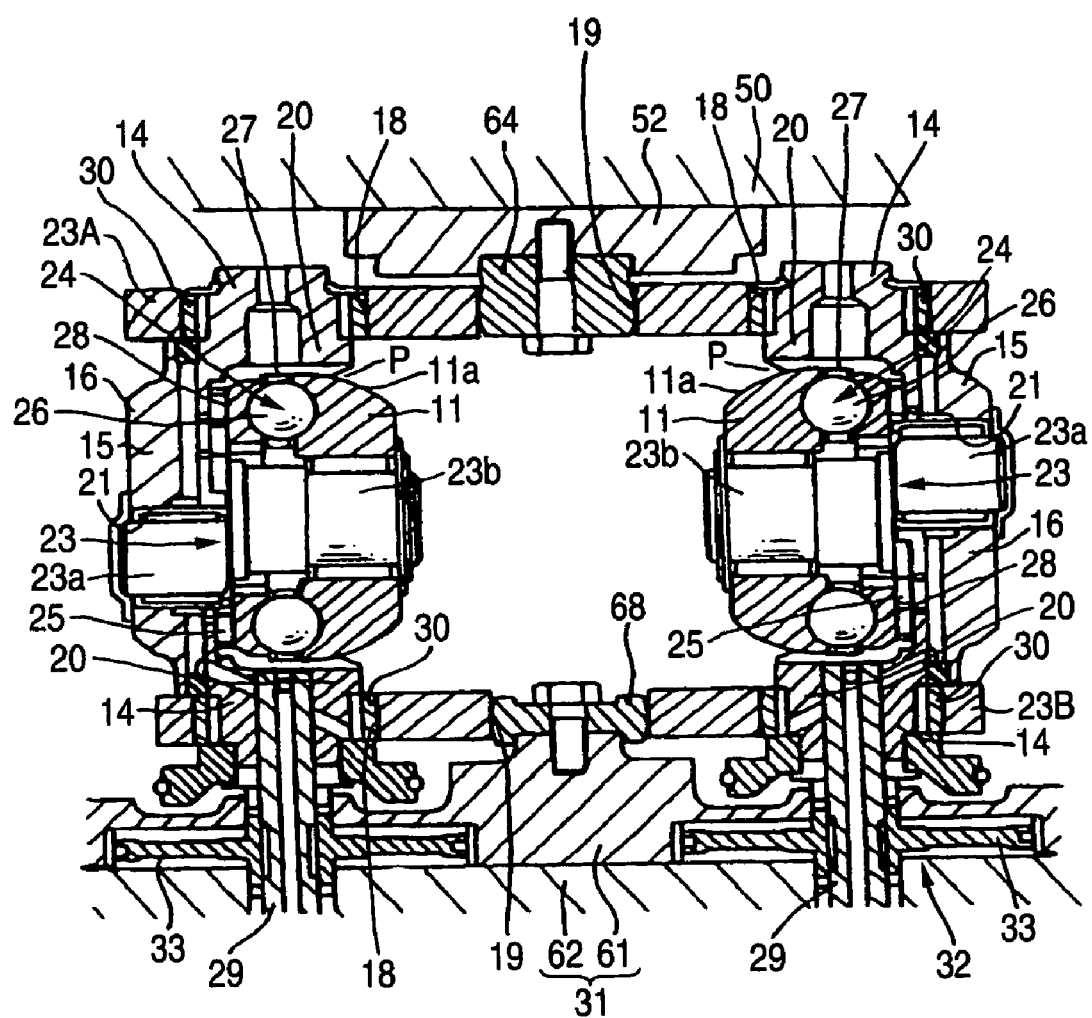
FIG. 4 is a section view taken along the line A-A shown in FIG. 3.

Now, description will be given below of an embodiment according to the invention with reference to the accompanying drawings. Here, the characteristic aspect of the invention consists in a disk surface structure for reducing a pressing force applied by a pressing device and the other remaining structures and operations thereof are similar to the before-mentioned conventional structures and operations. Therefore, in the following description of this specification, only the characteristic portions of the invention will be described and other remaining portions will be explained only briefly with the same reference characters as shown in FIGS. 3 and 4 given.

Figure 1:
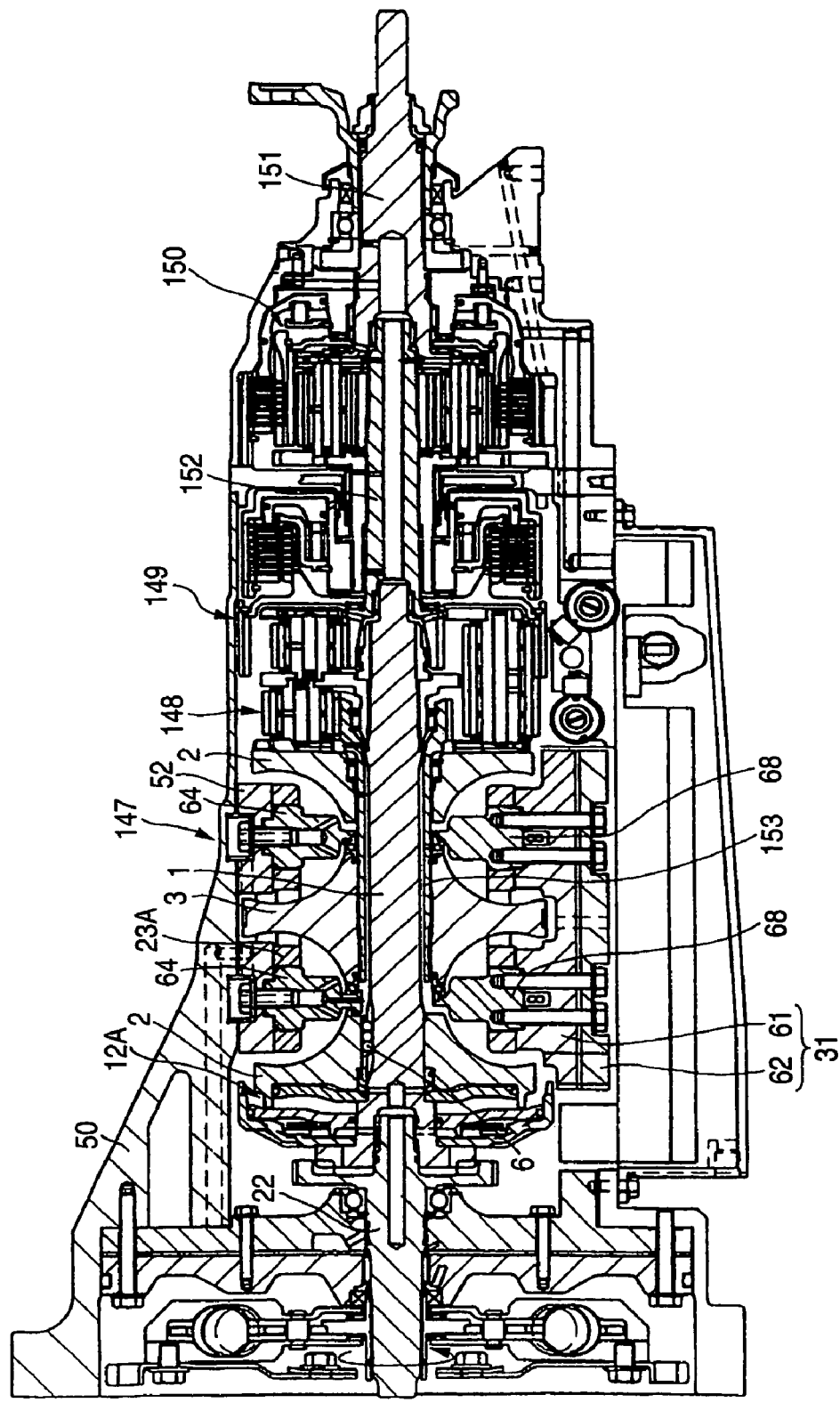
FIG. 1 is a section view of the main portions of a toroidal type continuously variable transmission according to an embodiment of the invention.

Now, FIG. 1 shows a structure in which a toroidal type continuously variable transmission is incorporated into a continuously variable transmission apparatus of a geared neutral type. The continuously variable transmission is constructed by combining a toroidal type continuously variable transmission unit 147 substantially similar in structure to the before-mentioned structure shown in FIG. 3 with first to third planetary gear type transmission units 148, 149, 150, and includes an input shaft 1 and output shaft 151. Also, between the input shaft 1 and output shaft 151, there is interposed a transmission shaft 152 which is concentric with these shafts 1, 151 and can be rotated with respect to these shafts 1, 151. Here, a pressing device 12A is of a hydraulic pressure type, while input side and output side disks 2, 3 are supported with respect to a hollow shaft 153 through which the input shaft 1 penetrates. Also, the input shaft 1 is arranged such that it receives a rotational force from a drive shaft 22 through the pressing device 12A. As known well, according to this structure, by taking out power from the respective planetary gear type transmission units, transmission can be achieved between two or more speed modes (for example, between a low speed mode and a high speed mode).

Figures 2A, 2B:
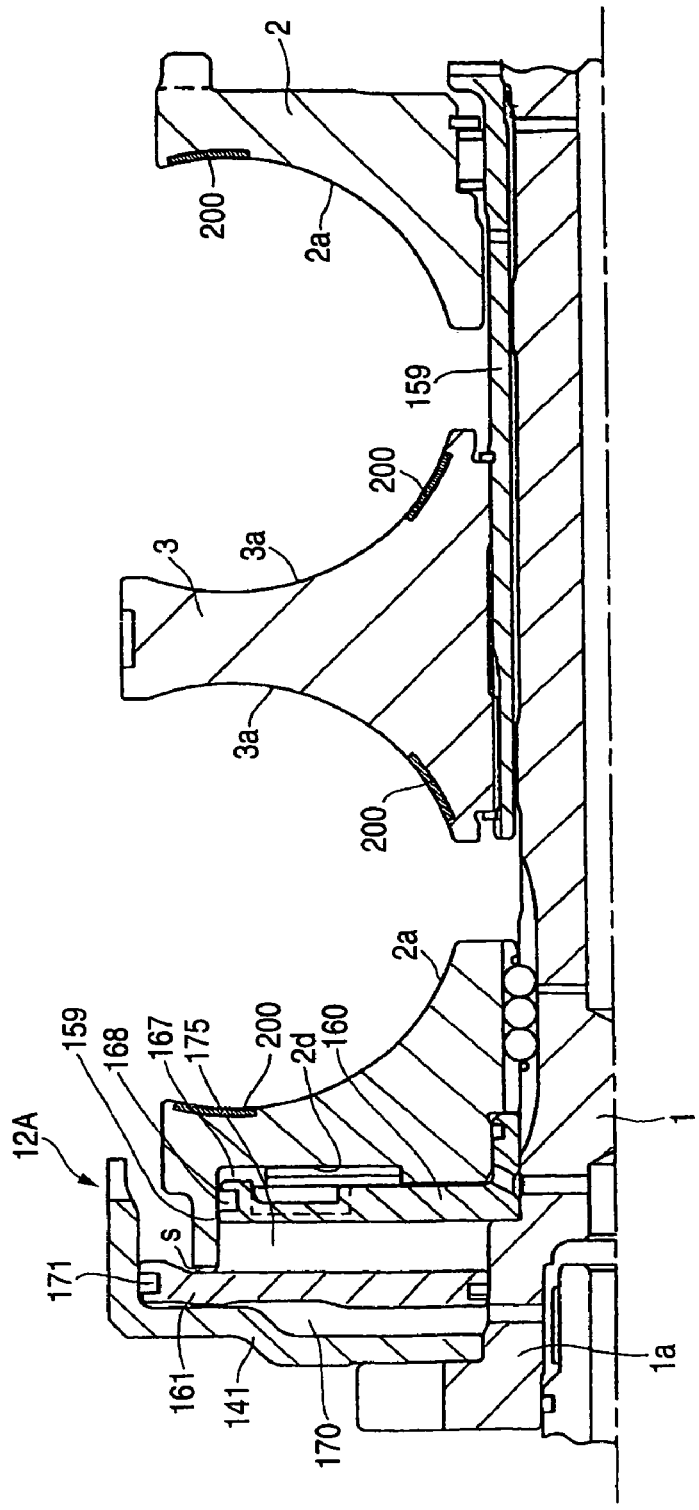
FIG. 2A is an enlarged section view of the main portions of the toroidal type continuously variable transmission shown in FIG. 1.
FIG. 2B is an enlarged section view of the fine groove according to the embodiment of the invention.

As shown in FIG. 2, the pressing device 12A includes a first cylinder portion 141 to be connected to the input end portion 1a of the input shaft 1, a second cylinder portion 159 formed integral with the input side disk 2, a first circular-shaped body 161, and a second circular-shaped body 160.

The first cylinder portion 141 is situated outside the outer periphery of the second cylinder portion 159 and is arranged such that it is opposite the back surface 2d of the input side disk 2. Also, the second cylinder portion 159 is formed in a cylindrical shape and extends from the outer peripheral edge of the input side disk 2 toward the first cylinder portion 141.

The second circular-shaped body 160 is arranged such that its inner peripheral surface is fitted with the outer peripheral surface of the input shaft 1 and its outer peripheral surface is fitted with the inner peripheral surface of the second cylinder portion 159, while the second circular-shaped body 160 is disposed so as to be opposite the back surface 2d of the input side disk 2. Also, the first circular-shaped body 161 is arranged such that its inner peripheral surface is fitted with the outer peripheral surface of the input shaft 1 and its outer peripheral surface is fitted with the inner peripheral surface of the first cylinder portion 141, while the first circular-shaped body 161 is interposed between the second circular-shaped body 160 and first cylinder portion 141.

A space existing between the first cylinder portion 141 and first circular-shaped body 161 forms a first hydraulic pressure chamber (oil chamber) 170. This first hydraulic pressure chamber 170 is kept fluid tightly by two or more seal members 171. Also, a space between the second cylinder portion 159 and second circular-shaped body 160 forms a second hydraulic pressure chamber (oil chamber) 167. This second hydraulic pressure chamber 167 is kept fluid tightly by two or more seal members 168. And, a space 175 existing between the second circular-shaped body 160 and first circular-shaped body 161 provides an air chamber. The air chamber 175 is kept fluid tightly by two or more seal members 168, 171. Also, the second cylinder portion 159 includes, between the first circular-shaped body 161 and itself, a clearance s which also serves as a communication groove to allow the air chamber 175 to communicate with the outside; and, the second cylinder portion 159 can be contacted with the first circular-shaped body 161 through the clearance s. By the way, for supply of hydraulic to the respective hydraulic pressure chambers 167, 170, there are formed liquid passages respectively in the drive shaft 22 and input shaft 1.

Also, in the radially outer part (near-to-outer-periphery portion) of the inner peripheral surface 2a of the input side disk 2 and in the radially inner part (near-to-center portion) of the inner peripheral surface 3a of the output side disk 3, that is, in the inner peripheral surface areas of the input and output side disks 2, 3 where the disks are contacted with their respective power rollers 11 at the before-mentioned speed mode switching areas or in the neighborhood of such areas, there are formed fine grooves 200. Each of the fine grooves 200 is set such that it has a depth D of about 1-10 μm and a pitch P1 of about 100-300 μm (see FIG. 2B). By the way, the head portion 202 or corner portions 204 of each fine groove 200 are rounded in a separate finishing step. Also, the fine grooves 200 may also be formed in other disk inner peripheral areas than the areas shown in FIG. 2 (for example, in the entire areas of the disk inner peripheral surface).

As described above, in a toroidal type continuously variable transmission according to the present embodiment, due to use of the pressing device 12A of a hydraulic pressure type, the optimum pressing force can be applied in accordance with transmission gear ratios. Also, in the present embodiment, because there formed the fine grooves 200 in the inner peripheral surface areas of the input and output side disks 2, 3 where the disks are contacted with their respective power rollers 11 at the before-mentioned speed mode switching areas or in the neighborhood of such areas, the design traction coefficient can be increased, which makes it possible to reduce the pressing force. Thanks to this, by reducing the pressing force in the periphery of the speed mode switching areas, the torque shift can be reduced, or it is possible to secure an allowance for the gross slip at the speed mode switching areas.

Here, when the roughness of the fine groove 200 is large, there is a possibility that the rolling life can be shortened. Therefore, the fine grooves 200 are not formed in the entire areas of the traction surface but, preferably, as in the present embodiment, there may be formed the fine grooves 200 only at the speed mode switching areas. This is advantageous in working as well. That is, in the case of the fine groove 200, as described before, the head portion 202 thereof or the corner portions 204 thereof must be rounded, which requires a separate finishing step to be executed. In this case, if the fine grooves 200 are formed only at the speed mode switching areas to thereby narrow the finishing range, the working costs of the fine grooves can be reduced.

Figure 5:
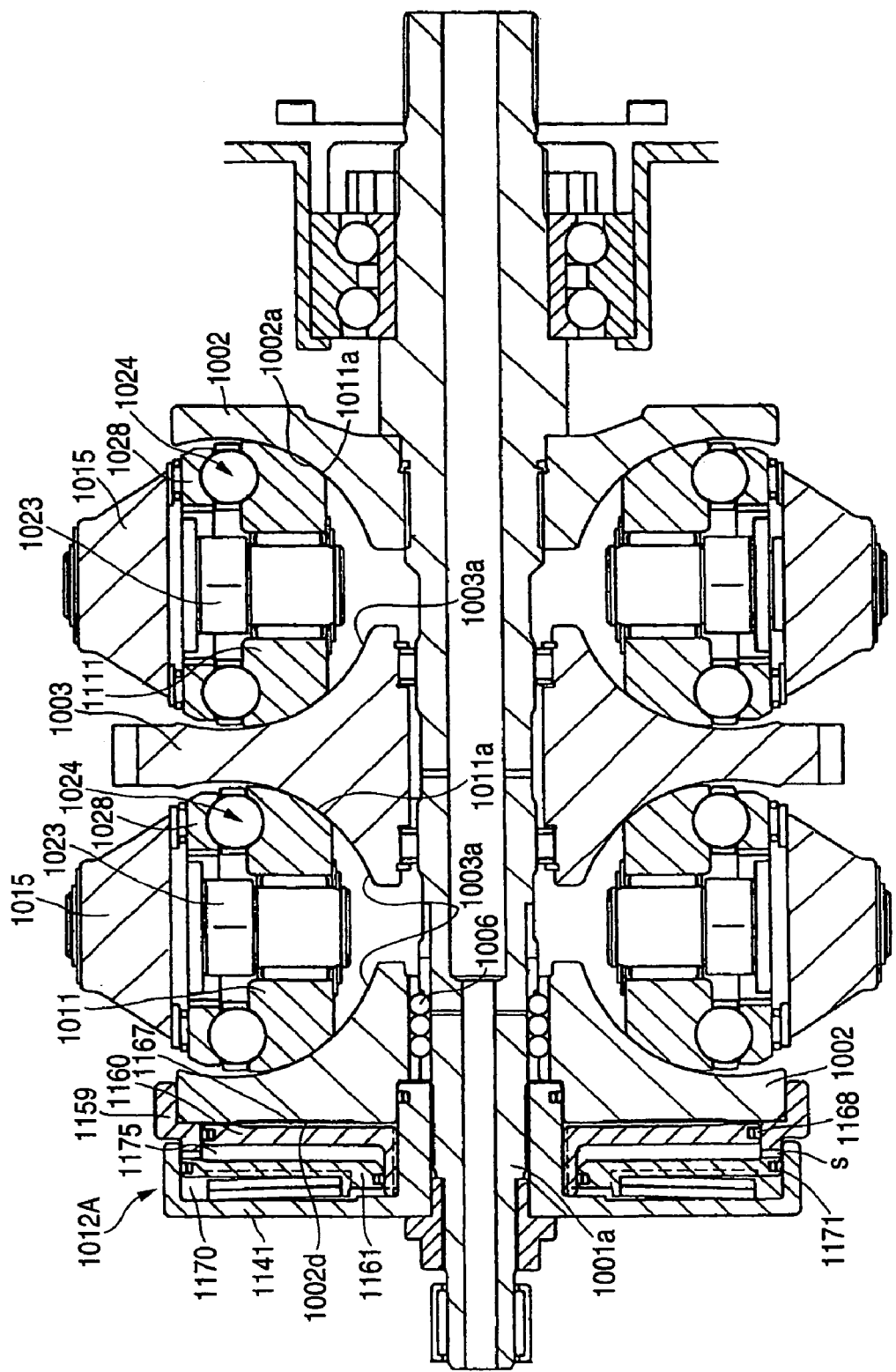
FIG. 5 is a section view of the main portions of a half toroidal type continuously variable transmission according to an embodiment of the invention.
Figure 6A:
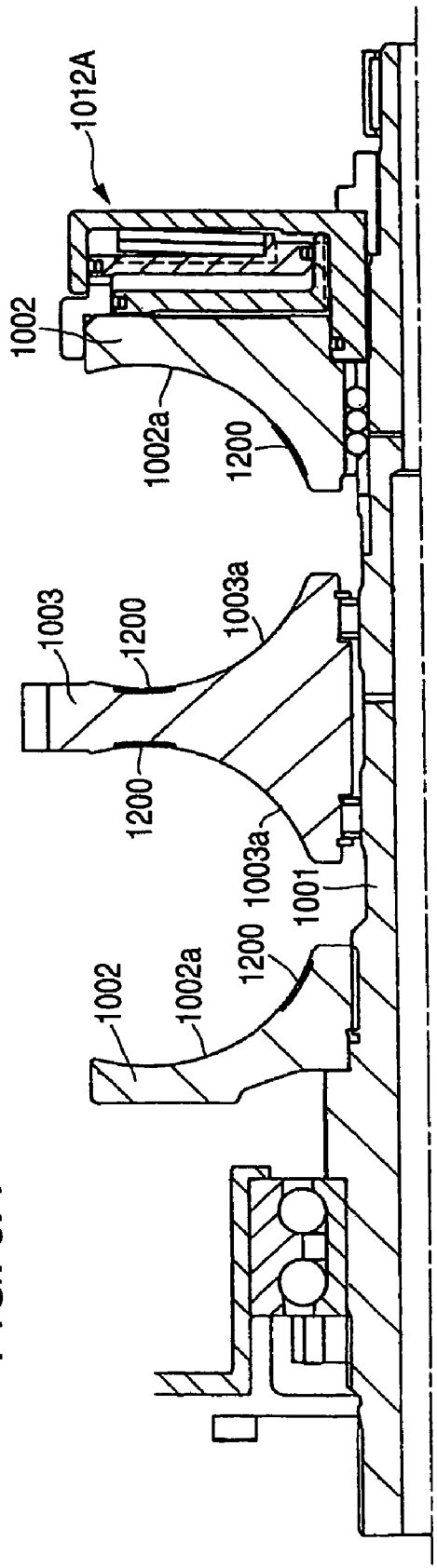
FIG. 6A is an enlarged section view of the main portions of the half toroidal type continuously variable transmission shown in FIG. 5.

FIGS. 5 and 6 respectively show a half toroidal type continuously variable transmission according to another embodiment of the invention. As shown in FIG. 5, on the back surface 1002d of an input side disk 1002 located on the input side of an input shaft 1001, there is provided a pressing device 1012A of an hydraulic pressure type for pressing against the input side disk 1002 toward the axial direction. This pressing device 1012A includes a first cylinder portion 1141 to be connected to the input end portion 1001a of the input shaft 1001, a second cylinder portion 1159 formed integral with the input side disk 1002, a first circular-shaped body 1161, and a second circular-shaped body 1160.

The first cylinder portion 1141 is engaged with the outer periphery of the second cylinder portion 1159 and is arranged such that it is opposite the back surface 1002d of the input side disk 1002. Also, the second cylinder portion 1159 is formed in a cylindrical shape and extends from the outer peripheral edge of the input side disk 1002 toward the first cylinder portion 1141.

The second circular-shaped body 1160 is formed such that its inner peripheral surface is fitted with the outer peripheral surface of the input shaft 1001 and its outer peripheral surface is fitted with the inner peripheral surface of the second cylinder portion 1159; and, the second circular-shaped body 1160 is arranged to be opposite the back surface 1002d of the input side disk 1002. Also, the first circular-shaped body 1161 is formed such that its inner peripheral surface is fitted with the outer peripheral surface of the input shaft 1001 and its outer peripheral surface is fitted with the inner peripheral surface of the first cylinder portion 1141; and, the first circular-shaped body 1161 is interposed between the second circular-shaped body 1160 and first cylinder portion 1141.

A space existing between the first cylinder portion 1141 and first circular-shaped body 1161 forms a first hydraulic pressure chamber (oil chamber) 1170. This first hydraulic pressure chamber 1170 is kept fluid tightly by two or more seal members 1171. Also, a space between the second cylinder portion 1159 and second circular-shaped body 1160 forms a second hydraulic pressure chamber (oil chamber) 1167. This second hydraulic pressure chamber 1167 is kept fluid tightly by two or more seal members 1168. Further, a space 1175 situated between the second circular-shaped body 1160 and first circular-shaped body 1161 provides an air chamber. The air chamber 1175 is kept fluid tightly by the two or more seal members 1168, 1171. And, the second cylinder portion 1159 includes, between the first circular-shaped body 1161 and itself, a clearance s to serve also as a communication groove which allows the air chamber 1175 to communicate with the outside; and, the second cylinder portion 1159 can be contacted with the first circular-shaped body 1161 through this clearance s. For supply of working fluid to the respective hydraulic pressure chambers 1167, 1170, there are formed liquid passages in the input shaft 1022 located on the engine side.

Figure 6B:
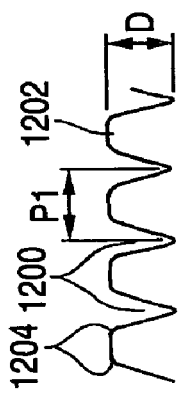
FIG. 6B is an enlarged section view of the fine groove according to another embodiment of the invention.

Also, as shown clearly in FIG. 6, there are formed fine grooves 1200 respectively in the radially inner part of the inner peripheral surface 1002a of the input side disk 1002 and in the radially outer part of the inner peripheral surface 1003a of the output side disk 1003. Each of the fine grooves 1200 is formed such that its depth D is of the order of 1-10 μm and its pitch P1 is of the order of 100-300 μm (see FIG. 6B). By the way, the head portion 1202 or corner portions 1204 of the fine groove 1200 are rounded in a separate finishing step. Further, the fine grooves 1200 may also be formed in the other disk inner peripheral surface areas than the areas shown in FIG. 6 (for example, in the entire area of the disk inner peripheral surface).

According to the above-mentioned structure, to change the rotation speed between the input shaft 1001 and output shaft (not shown), specifically, to reduce the rotation speed between the input shaft 1001 and output shaft, the respective trunnions 1015 may be swung about their corresponding pivot shafts 1014 to thereby incline the respective shift shafts 1023 so that the peripheral surfaces 1011a of the respective power rollers 1011 can be contacted with the radially inner parts (the near-to-center portions) of the inner peripheral surfaces 1002a of the input side disks 1002 and also with the radially outer parts (the near-to-outer-periphery portions) of the inner peripheral surfaces 1003a of the output side disks 1003. On the other hand, to increase the rotation speed, the respective trunnions 1015 may be swung to thereby incline the respective shift shafts 1023 so that the peripheral surfaces 1011a of the respective power rollers 1011 can be contacted with the radially outer parts (the near-to-outer-periphery portions) of the inner peripheral surfaces 1002a of the input side disk 1002 and also with the radially inner parts (the near-to-center portions) of the inner peripheral surfaces 1003a of the output side disks 1003. In other words, the present embodiment provides a structure in which the fine grooves 1200 are formed in the contact areas between the input and output side disks 1002, 1003 and their respective power rollers 1011 which substantially correspond to the low speed (reduction) time.

As has been described above, in a toroidal type continuously variable transmission according to the present embodiment, due to use of the pressing device 1012A of a hydraulic pressure type, the optimum pressing force can be applied in accordance with transmission gear ratios. Also, in the present embodiment, the fine grooves 1200 are formed at least in the radially inner parts of the inner peripheral surfaces 1002a of the input side disk 1002 and in the radially outer parts of the inner peripheral surfaces 1003a of the output side disks 1003, that is, in the contact areas between the input and output side disks 1002, 1003 and their respective power rollers 1011 which substantially correspond to the low speed (reduction) time. Thanks to this, the design traction coefficient can be increased. This not only can reduce the pressing force but also can enhance the durability of the respective parts (for example, disks 1002, 1003, power rollers 1011, trunnions 1015, and shaft 1001), thereby being able to reduce the size of the transmission.

By the way, when the roughness of the fine groove 1200 is large, there is a possibility that the rolling life can be shortened. Therefore, the fine grooves 1200 may not be formed in the whole area of the traction surface but, preferably, as in the present embodiment, the fine grooves 1200 may be formed only on the low speed side which is small in the frequency of use and provides a high load. This arrangement is advantageous also in working. In other words, when forming the fine grooves 1200, as described above, the head portions 1202 thereof or the corner portions 1204 thereof must be rounded, which requires a separate finishing step for rounding them. However, if the fine grooves 1200 are formed only on the low speed side to thereby narrow the finishing range, the working cost can be reduced.

The present invention can apply not only to a half toroidal type continuously variable transmission of various types such as a single cavity type or a double cavity type but also to a full toroidal type continuously variable transmission having no trunnions.

Figure 7:
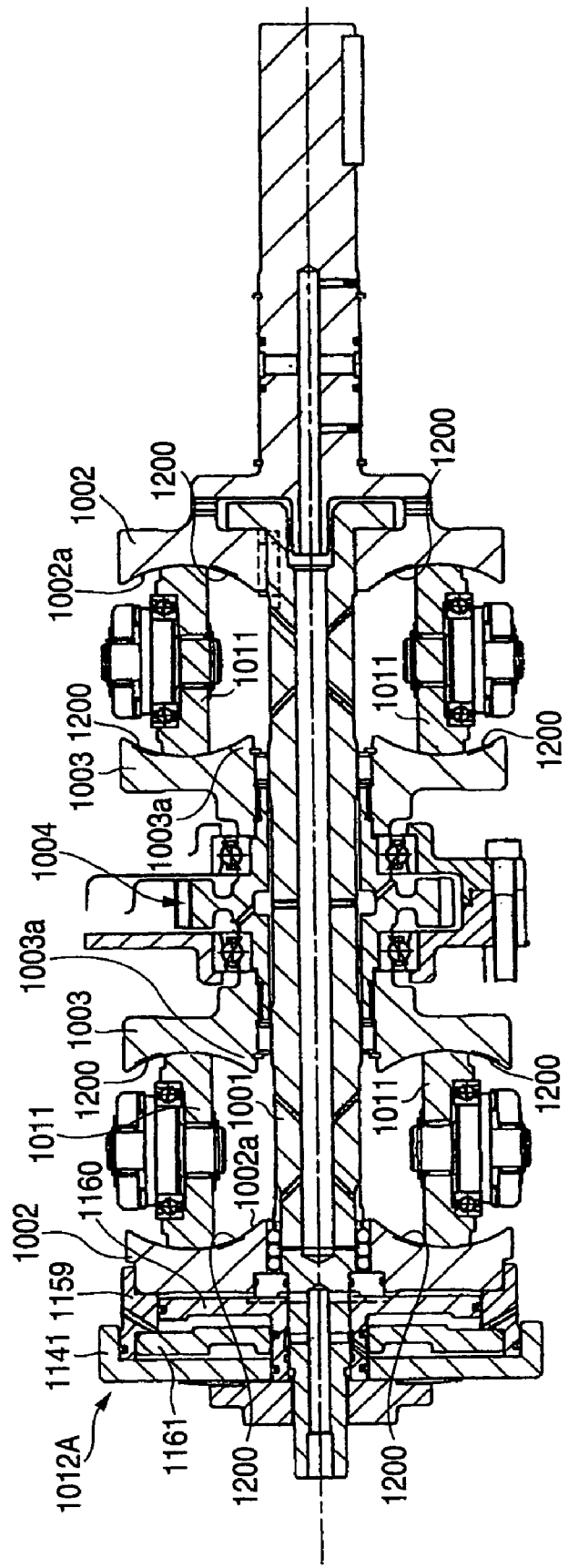
FIG. 7 is a section view of the main portions of a full toroidal type continuously variable transmission according to a modification of the invention.

The present invention is not limited to the above-described embodiment but, of course, it can also be enforced in variously modified manners without departing from the subject matter thereof. For example, in the above-described embodiment, the invention is applied to a half toroidal type continuously variable transmission. However, the invention can also be applied to such a full toroidal type continuously variable transmission having no trunnion as shown in FIG. 7. That is, in the full toroidal type continuously variable transmission shown in FIG. 7, the fine grooves 1200 may be formed respectively in the radially inner parts of the inner peripheral surfaces 1002a of the input side disk 1002 and in the radially outer parts of the inner peripheral surfaces 1003a of the output side disks 1003.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A toroidal type continuously variable transmission comprising:
    an input shaft to which a rotation torque is input;
    an input side disk and an output side disk that are concentrically and rotatably supported by the input shaft in a state that an inner peripheral surface of the input side disk opposes to an inner peripheral surface of the output side disk;
    a power roller held between the input side disk and the output side disk; and
    a hydraulic loading device applying predetermined pressing force so that the power roller is pressed between the input side disk and the output side disk,
    wherein fine grooves are formed on at least a radially inner part of the inner peripheral surface of the input side disk and at least a radially outer part of the inner peripheral surface of the output side disk, respectively.

2. A toroidal type continuously variable transmission apparatus comprising:
    a toroidal type continuously variable transmission comprising:
        an input shaft to which a rotation torque is input;
        an input side disk and an output side disk that are concentrically and rotatably supported by the input shaft in a state that an inner peripheral surface of the input side disk opposes to an inner peripheral surface of the output side disk;
        a power roller held between the input side disk and the output side disk; and
        a hydraulic loading device applying predetermined pressing force so that the power roller is pressed between the input side disk and the output side disk; and
    a planetary gear transmission unit adopted to switch a pluralities of speed mode,
    wherein fine grooves are formed on around speed mode changing areas of respective the inner peripheral surfaces of the input side disk and the output side disk, and
    wherein the speed mode switching areas contact with the power roller when the planetary gear transmission unit switches the speed mode.

3. The toroidal type continuously variable transmission apparatus as set forth in claim 2, wherein the fine grooves are formed on a radial outer part of the inner peripheral surface of the input side disk and on a radial inner part of the inner peripheral surface of the output side disk, respectively.

4. The toroidal type continuously variable transmission apparatus as set forth in claim 2, wherein the planetary gear transmission unit is connected with the input side disk and the output side disk.

5. The toroidal type continuously variable transmission as set forth in claim 1, wherein depth of the fine groove is 1 μm or more and 10 μm or less.

6. The toroidal type continuously variable transmission as set forth in claim 1, wherein pitch of the fine grooves is 100 μm or more and 300 μm or less.

7. The toroidal type continuously variable transmission apparatus as set forth in claim 2, wherein depth of the fine groove is 1 μm or more and 10 μm or less.

8. The toroidal type continuously variable transmission apparatus as set forth in claim 2, wherein pitch of the fine grooves is 100 μm or more and 300 μm or less.

* * * * *